F. GÖSSEL.
MANUFACTURE OF ARTIFICIAL MILK.
APPLICATION FILED MAY 5, 1914. RENEWED MAR. 25, 1915.
1,139,031.
Patented May 11, 1915.
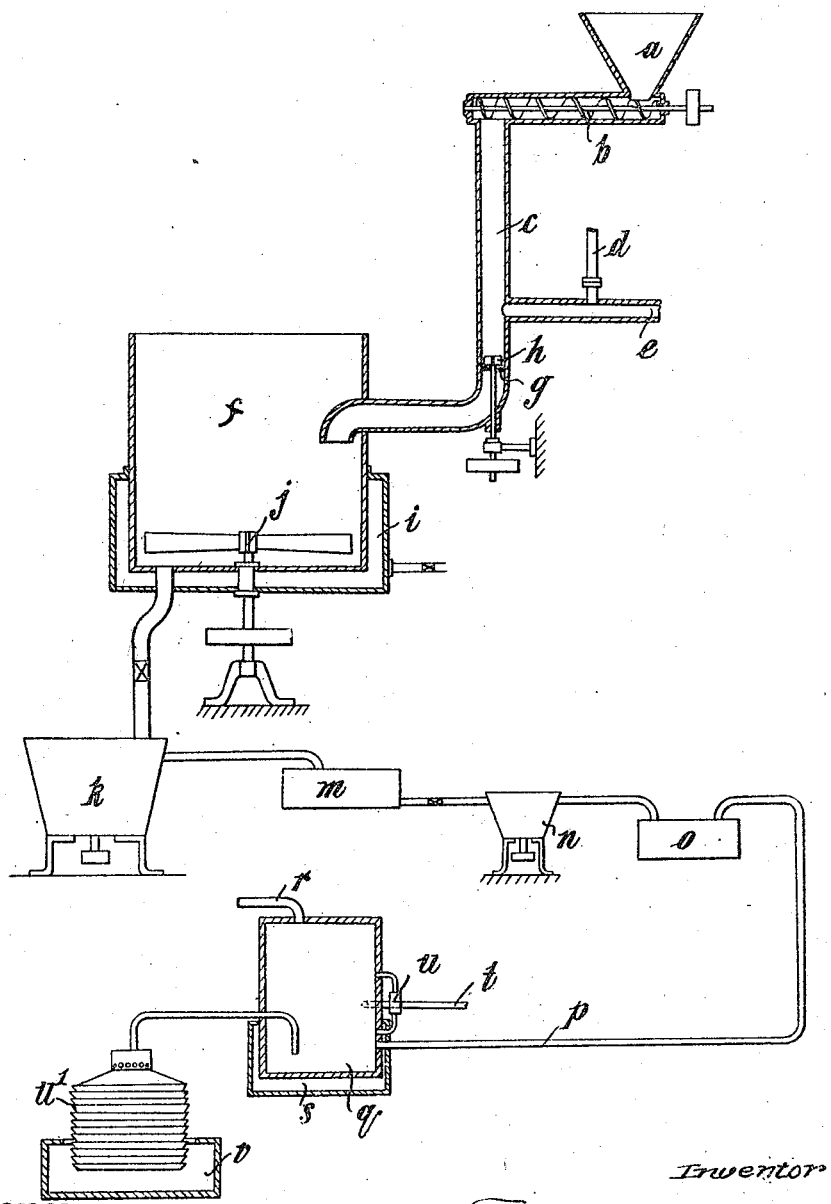

UNITED STATES PATENT OFFICE.

FRITZ GÖSSEL, OF FRANKFORT-ON-THE-MAIN, GERMANY.

MANUFACTURE OF ARTIFICIAL MILK.

1,139,031.      Specification of Letters Patent.      Patented May 11, 1915.

Application filed May 5, 1914, Serial No. 836,426. Renewed March 25, 1915. Serial No. 17,051.

*To all whom it may concern:*

Be it known that I, FRITZ GÖSSEL, citizen of the German Empire, residing at Frankfort-on-the-Main, Germany, have invented certain new and useful Improvements in the Manufacture of Artificial Milk, of which the following is a specification.

This invention relates to the manufacture of artificial milk from vegetable seeds or beans in a manner similar to that described in my prior Patent 1082118 patented December 23rd, 1913. The present invention is directed to a process of manufacturing such an artificial milk in a cheap and effective manner.

In manufacturing artificial milk from the soy bean, it is sought first of all to obtain an extract containing the ingredients of the bean which resemble the components of milk. In the manufacture of any particular kind of milk the next step is to add to and emulsify with this extract any other ingredients as may be lacking therein. By the present method it is possible to obtain a highly nutritious and pleasant tasted milk in which the albumins and fats are very finely divided and perfectly emulsified; and the milky product may at pleasure be varied to simulate various natural milks.

In the following description while I shall refer more specifically to the use of soy beans, it will be understood that the other seeds, and mixtures of seeds, referred to in said patent may be used in the same way. The beans are washed, decorticated and then ground into a fine flour. In practice the flour should be fine enough to pass through a 100 mesh sieve, as the fineness of the flour improves the efficiency of the extraction. If a coarser flour is used then a relatively greater quantity must be employed to get the same strength or concentration in the extract.

In the accompanying illustration I have shown more or less diagrammatically, partly in vertical section and partly in elevation, an organization of apparatus elements which may be usefully employed in the hereindescribed process.

In this showing, element $a$ is a hopper or receptacle for fine flour. Communicating with it is a screw conveyer $b$ leading to chute $c$. Communicating with this chute are a water pipe $d$ and steam pipe $e$. Within the chute is a rubbing and mixing device composed of a sieve $g$ provided with rotating brush $h$. The chute feeds to mixer $f$ heated by a steam jacket $i$. The mixer is provided with a stirrer $j$ run by any suitable power. Communicating with this mixer is a centrifugal separator $k$. This centrifugal separator discharges liquid into cooling tank $m$. Liquid may be taken from this tank to a centrifugal device of the general type of a cream separator $n$. Liquid treated in this separator passes to tank $o$. From this tank it passes through pipe $p$ to emulsifier $q$. Vacuum may be produced in this vessel by a pipe $r$ communicating with any suitable vacuum producing means. The emulsifier is provided with a steam jacket $s$, an inlet $t$ for oil or fat and a sight gage $u$. A glass window may also be used. From the emulsifier the material may pass via cooler $u'$ into a storage tank $v$ whence it may be withdrawn by any suitable means and packaged in any suitable manner.

The soy bean, as well as other analogous seeds, varies in composition and in the solubility or ease of extraction of the albumin and fats. There is a variation also with the age of the bean or meal. For the purpose of facilitating extraction, it is best to add phosphate of soda or a similar substance in small quantities.

In a specific embodiment of my process using the apparatus described, I first feed the fine flour from $a$ by means of $b$ to element $c$. In $c$ the flour is mixed with water and brought into the form of a thin paste. The water entering by pipe $d$ may be tempered by steam from pipe $e$ so that it contacts with the flour at a temperature of about 90 to 95° C. The water used should be as pure as possible and is preferably boiled and cooled before entering through pipe $d$. Presuming that about 100 liters of milk are to be made in an operation, the quantity of flour fed in may be 10 kilograms. If the flour is sufficiently fine the quantity of water may be 100 liters. With this quantity about 5 grams of phosphate of sodium will be sufficient where the bean flour is of the ordinary freshness. The "aging" or deteriorating action proceeds more quickly on flour than on the bean and for this reason the flour should always be used as soon after grinding as may be. The thin paste in $c$ is best well rubbed down before going to the mixer $f$. For this purpose sieve $g$ and rotating brush $h$ are convenient. The pasty material passing to $f$ is kept therein until the extraction is sufficiently complete. As a rule the temperature should be about 95° C. and ordinarily extraction will be complete in about an hour. While the soy bean flour of course varies, it may be assumed to have a composition about as follows:

| | | |
|---|---|---|
| Albumin | 43 | per cent. |
| Fats and fatty acids | 22 | " " |
| Carbohydrate | 21 | " " |
| Salts | 5.5 | " " |
| Cellulose and fiber | 8.5 | " " |
| | 100.0 | |

Using a kilo of flour with 10 liters of water, with the usual degree of extraction (which is of course never absolutely perfect) it may be assumed that with material of this analysis the liquid in the mixer will contain on an average about—

| | | |
|---|---|---|
| Albumin | 3.7 | per cent. |
| Fats, fatty acids | 2.0 | " " |
| Carbohydrate | 1.8 | " " |
| Salts | 0.5 | " " |

The liquid in the mixing device of course contains a solid residue in addition to the materials which have gone into solution. This must be separated, which may be conveniently effected in the centrifugal separator $k$ shown. Care should be taken that no solid matter emerges with the liquid. The liquid leaving the centrifugal and passing into tank $m$ should be cooled down; best approximately to room temperature. It is often advisable to reduce the quantity of oil or fat in the liquid, thereby reducing the particular flavor of the soy bean. This separation or partial separation of fat may be effected in the separator $n$ shown. The liquid leaving this separator and having its content of fat and oil reduced to the desired degree is the raw material for the manufacture of milk. This milk in the present process now has its composition adjusted to simulate more nearly a natural animal milk. For this purpose it is ordinarily necessary to add additional materials. The amounts to be added will in all cases depend on the degree of concentration of the extract and on the amount of fats or fatty acids removed in the separator $n$. If we assume that 1 per cent. of fats still remain in the liquid and it is desired to produce a milk containing say 3.5 per cent. of fats, then in the case under consideration 2.5 kilos of any suitable fat or oil or mixture of fats or oils may be added. The other ingredients to be added may be calculated the same way. The ingredients usually added are soluble carbohydrates (sugars), sodium chlorid, and carbonate of sodium or the like. With material such as just described about 2.4 kilograms of carbohydrate may be added, with 6 grams of sodium chlorid and 60 grams of carbonate of sodium.

The choice of the fat to be used and also of the carbohydrate is determined by the nature of the product desired. If a thick creamy liquid is desired, a thick or heavy oil is used, such as cocoanut oil. If a thinner product is required a thinner oil or mixture of oils is used, such as sesame oil. The carbohydrate, or carbohydrate material, used depends on the flavor and other properties desired. Cane or beet sugar, milk sugar, malt extract, etc., may be used. If it is desired to produce a milk which will not discolor on heating, malt extract is avoided and milk sugar or beet or cane sugar is used or any mixture of these. Choice as regards flavor, etc., of oil or carbohydrate must of course in every case be made according to the results required and this also applies to the addition of any flavoring or bacterial culture which may be added. The added ingredients are thoroughly admixed and emulsified with the liquid in $q$. Emulsification may be under either pressure or vacuum, and is advantageously under vacuum. While ordinary types of emulsifying apparatus in which liquids are passed at a high pressure through narrow tortuous passages, etc., may be used, I regard as advantageous a simple type of apparatus using vacuum, such as is illustrated. In the emulsification it is advantageous to provide some degree of vacuum prior to introducing the liquid from tank $o$. During emulsification, the temperature may be maintained at from 35 to 40 C. At this temperature under vacuum the liquid may be boiled with a production of some vapors. It is best to add the oils and other ingredients during the emulsification rather than prior thereto (in vessel $o$), using for this purpose introductory means $t$. The added material should enter the emulsifier at about the same temperature as prevails therein or at a little higher temperature. Ebullition may be continued until complete emulsification is reached. Conditions in the emulsifier should be carefully watched and kept constant. A temperature of about the degree indicated gives very good results. When the liquid circulating within the emulsifier shows no visible indications of fatty globules or particles and is of a uniform nature, emulsification may be regarded as completed. The conditions should be carefully watched and kept constant and the temperature according to my experience hitherto, should be also kept about the degree indicated above. A glass window or glass tube $u$ should be provided in the tank $q$ to facilitate observation. When the liquid passing the glass shows no signs of fatty globules or particles and is of a uniform nature, emulsification, is completed. After the emulsification the liquid should be quickly cooled, as by the device $u'$ shown. The liquid finally collected in storage tank $v$ will of course be less than 100 liters, (operating in the described manner) since more or less vapor will be drawn off in producing the vacuum. Sufficient pure water may therefore be added to the milk to bring the volume back to 100 liters. The milk is now ready for consumption or use in cooking, baking, or the manufacture of the usual milk products.

If desired pure cultures of suitable bacteria such as the organism known as *B. lactis acidi* or *B. massal*, may be added to the milky material.

What I claim is:—

1. The method of manufacturing artificial milk from vegetable beans which comprises making an extract of such beans with hot water at a temperature below 100° C. of those ingredients suitable for making milk, removing undissolved substances from said extract and adding to and emulsifying with the extract fats, sugars and the like while maintaining the extract under as constant condition of temperature and pressure as possible.

2. The method of manufacturing artificial milk from vegetable beans which comprises making a water extract from beans in a finely divided form, of the albumins, fats, carbo-hydrates and salts contained therein, separating said extract completely from the residue of the beans and adding to the extract and emulsifying therewith fats, sugars and the like, said emulsification being effected under constant conditions of temperature and pressure.

3. The method of manufacturing artificial milk from vegetable beans which comprises making a water extract from such beans in a finely divided form, of the albumins, fats and carbohydrates and salts, separating said extract completely from the residue of the beans, removing a portion of the fats, and adding to the extract and emulsifying therewith additional fats, sugars and the like, said emulsification being effected under constant conditions of temperature and pressure.

4. The method of manufacturing synthetic milk from vegetable beans consisting in making an extract in water of the nutritive constituents of said beans, eliminating fatty matter from said extract and adding to and embodying with the resulting product such materials as are required to make its composition approximate that of milk.

5. The method of manufacturing artificial milk from vegetable beans which comprises treating fine flour of the bean with pure hot water and intimately mixing said flour and water at a temperature below the boiling point, retaining said flour and water in paste form and hot for a time, completely separating the liquid extract from the residue, removing a portion of the fats in said extract, and emulsifying fats with said extract at a temperature of about 40° C.

6. In the manufacture of artificial milk from vegetable beans, the process which comprises making an extract of the bean containing the fats, albumins and other constituents in finely divided form, introducing additional fats and other constituents of milk to said extract at approximately the same temperature as the extract itself and emulsifying said extract and fat under constant conditions of heat and pressure.

7. In the manufacture of artificial milk from vegetable beans, the process which comprises making an extract of the bean containing the fats, albumins and other constituents in finely divided form, passing said extract into an evacuated vessel and maintaining the same at a temperature of about 40° C., adding fat at about the same temperature and maintaining the vacuum and temperature so that the liquid is in a constant state of ebullition until emulsification is complete.

In testimony whereof I have signed my name to this specification in the presence of two subscribing witnesses.

FRITZ GÖSSEL.

Witnesses:
 LYON HARRIS,
 JEAN GRUND.